United States Patent [19]

Daifotes

[11] 4,052,697
[45] Oct. 4, 1977

[54] EMERGENCY BLINKER AND FLAG DISPLAY

[76] Inventor: Theodore Steven Daifotes, P.O. Box 383, Tuolumne, Calif. 95379

[21] Appl. No.: 757,456

[22] Filed: Jan. 6, 1977

[51] Int. Cl.² .............................................. B60Q 1/00
[52] U.S. Cl. .................................... 340/87; 116/28 R
[58] Field of Search .......................... 116/28 R, 124 B; 240/8.1 A; 340/84, 87

[56] References Cited

U.S. PATENT DOCUMENTS 3,520,273  7/1970  Daifotes ............................. 340/87 X Primary Examiner—Donald J. Yusko
Attorney, Agent, or Firm—Leslie M. Hansen

[57] ABSTRACT

A fold up spring loaded arm pivotally mounted on a vehicle and housing a folded flag tethered to one end of a second arm pivotally mounted on the free end of the spring loaded arm so as to open up, jack-knife fashion, upon release of the spring loaded arm from latched horizontal position in the vehicle to unfurl and display the flag for full view exteriorly of the vehicles, and manually controlled means in the vehicle for releasing the spring loaded arm from latched position. The warning signal also including an electrically illuminating lamp or lamps on the free end of the second named arm for illuminating the flag and for attracting attention to the warning means by on and off blinking of such lamps when the arms are in raised vertical position.

7 Claims, 8 Drawing Figures

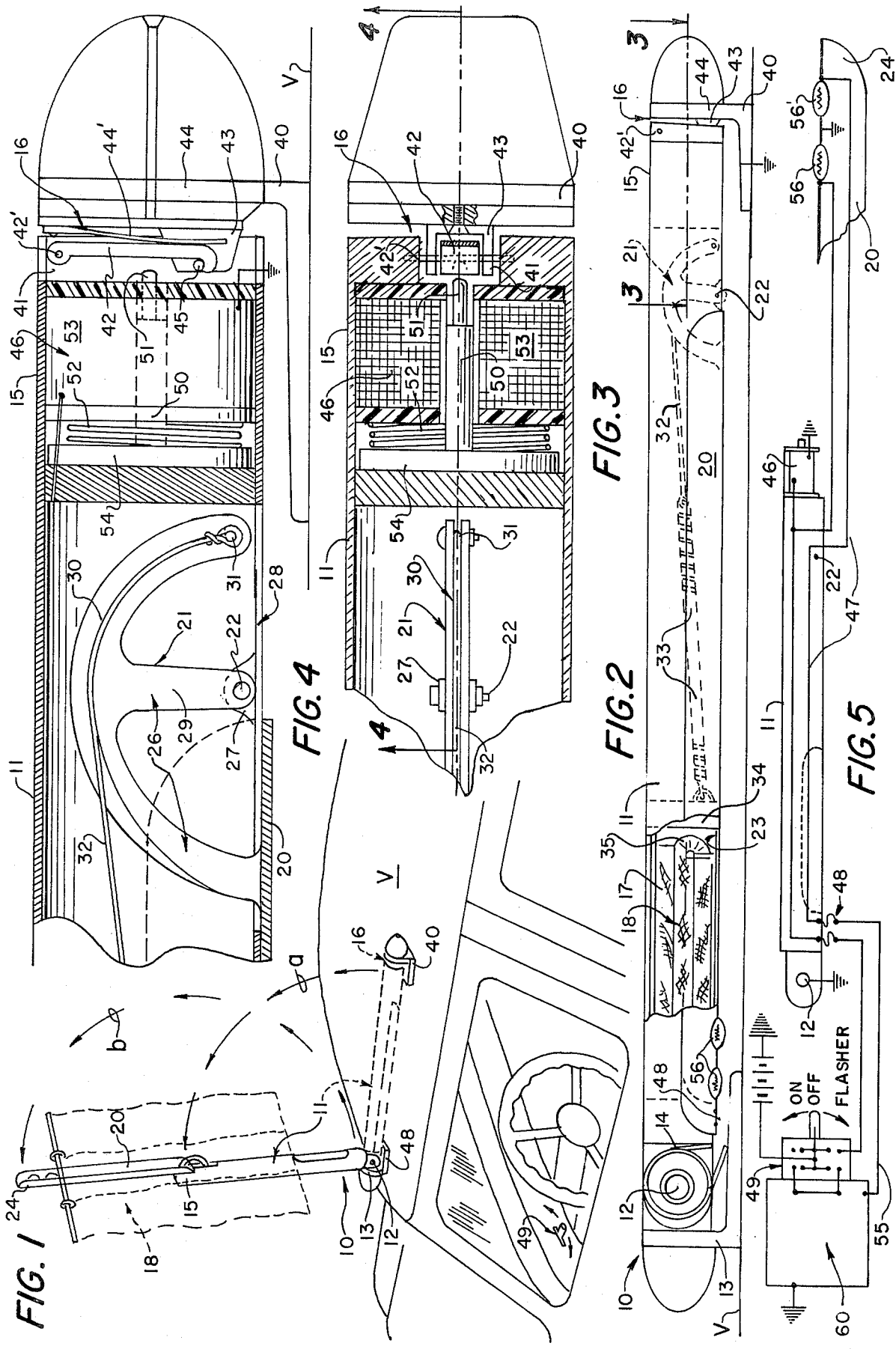

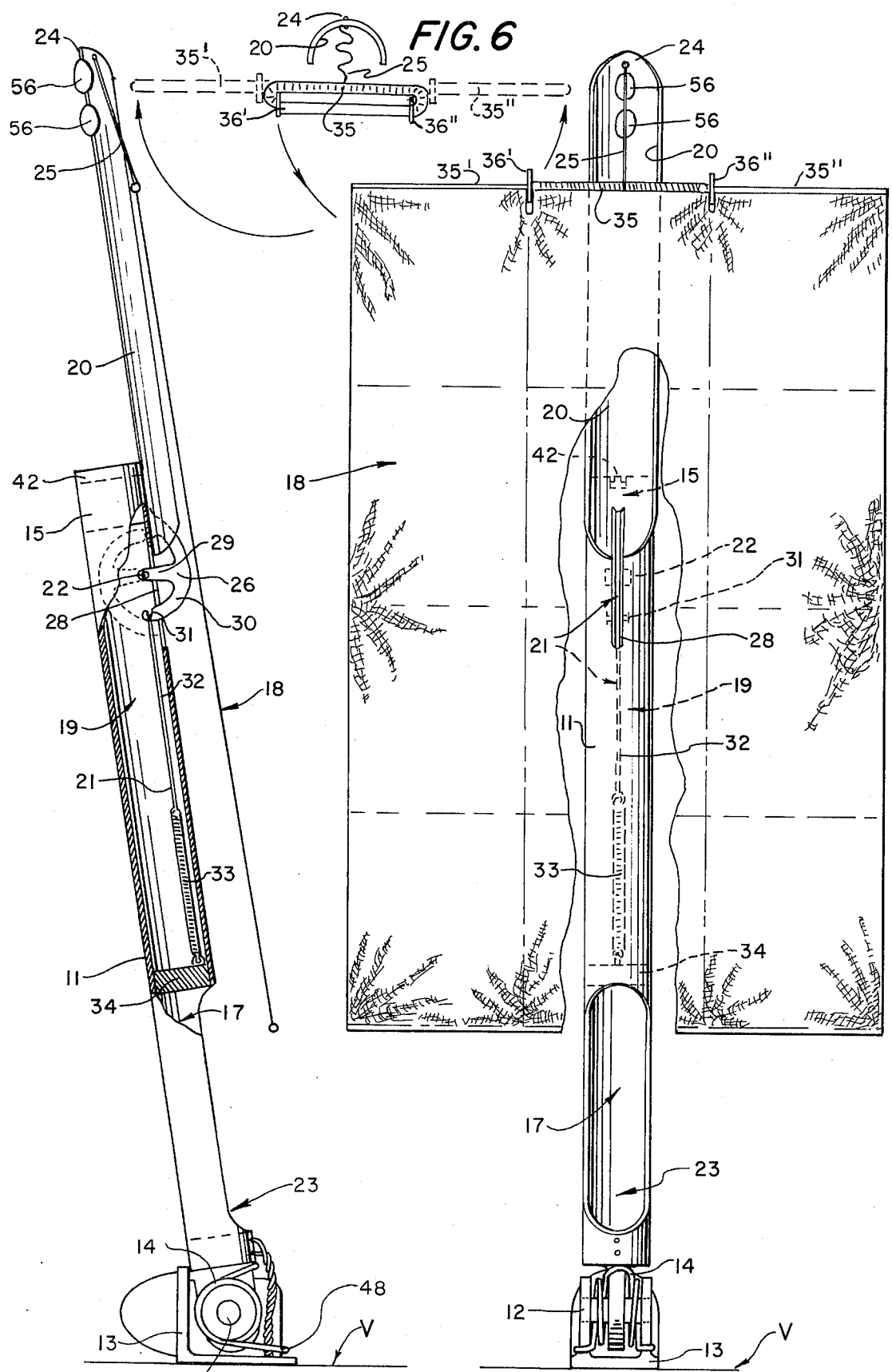

EMERGENCY BLINKER AND FLAG DISPLAY

BACKGROUND

This invention relates to emergency signaling apparatus of the type employed on highways to warn other vehicle operators of a stall. The invention has its embodiment in apparatus containing a spring loaded support arm and means for latching the support arm in horizontal position during normal operation of the vehicle. The latch is adapted to be released from within the vehicle so as to allow the spring loaded arm to swing toward vertical position and set up a warning signal at a high enough elevation to alert the drivers of oncoming vehicles of the stall.

The warning signal of this invention is adapted for use on a spring loaded arm along the lines of the one shown, described and claimed in my U.S. Pat. No. 3,520,273 which issued to me on July 19, 1970 for a Flare Support and Release Means Therefor.

THE PRESENT INVENTION

The signaling apparatus of the present invention has as its principal object the provision of an emergency signal on a vehicle for displaying an illuminated electric lamp and a flag so they will be visible during day light as well as in the dark of night for warning drivers of other or oncoming vehicles of a stopped vehicle in a stalled condition.

As will later become apparent the flag signal of the present invention is confined in a tubular housing formed as a part of the spring loaded support arm which is pivotally mounted on the vehicle. The flag is internally confined within the arm while the arm is latched down. However, upon release of the arm, the flag is released and unfurled concurrently with raising of the arm to visually display the flag at an elevation above the top of the vehicle. In conjunction with the raising of the flag, the support therefor which carries electric lamps, establishes an electrical current to illuminate the lamps for night time warning. In this connection the electrical circuit includes a flasher switch means whereby the lamps are caused to blink on and off to assure the attracting of attention to the signal.

These and other objects and advantages of the present invention will become apparent from a reading of the following description and claims in the light of the accompanying two sheets of drawing in which:

FIG. 1 is a perspective view of the blinker-flag signaling apparatus in raised condition relative to a car top;

FIG. 2 is a side elevation of the apparatus at larger scale, partly in section and folded down in latched condition upon the car top;

FIG. 3 is an enlarged section taken through the latch and release end of FIG. 2 taken along line 3—3 thereof;

FIG. 4 is a section taken along line 4—4 in FIG. 3;

FIG. 5 is a schematic wiring diagram of an electrical circuit embodied in the apparatus;

FIG. 6 is a detail plan of the flag folded and about to open up after its release;

FIG. 7 is a vertical section of the blinker-flag signaling apparatus in open, raised condition as in FIG. 1 but at larger scale with respect thereto; and FIG. 8 is an elevational view of the apparatus in raised condition as seen from the righthand side of FIG. 7.

GENERAL DESCRIPTION

Referring to FIGS. 1, 2, 7, and 8 of the drawing, the device 10 includes an arm 11 pivotally mounted as at 12 on a mounting block 13 fixed to a vehicle V. The arm 11 is spring activated relative to the vehicle body by a torsion spring 14 toward a vertical position (FIGS. 1, 7, and 8) but yieldable for movement toward horizontal position on the vehicle (FIG. 2). The opposite or free end 15 of the arm 11 is related to a latch mechanism 16 mounted on the vehicle and adapted to receive the end 15 of the arm 11 to hold the arm in horizontal position (FIG. 2) until released for automatic activation in the direction of the arrows as seen in FIG. 1. The foregoing general assembly is preferably although not necessarily mounted on the top of the vehicle V as shown in the region of the driver's seat 2 in FIG. 1.

DETAILED DESCRIPTION

In accordance with the present invention, the spring loaded arm 11 is tubular and divided into separate chambers. One chamber 17 is for housing a flag 18 in folded condition and the other 19 for supporting an extension member 20 and an actuating mechanism 21 therefor arranged in chamber 19 for causing extension of the member 20 beyond the free end 15 of the arm 11 upon release of the latter.

As best seen in FIGS. 1 and 7 the extension member 20 consists of an arm pivotally mounted as at 22 adjacent the free end 15 of the arm 11 so as to swing back into parallelism with the latter, jack-knife fashion. For purposes of the present invention the extension member 20 is half tubular so as to fit snuggly about the tubular arm 11 and form a cover over an access opening 23 formed therein the region of the flag conforming chamber 17.

The flag 18 is connected to the extreme end 24 of the extension member 20 by cord 25. The flag 18 is adapted to be folded neatly into a shape to fit within the chamber 17 when the extension member 20 is jack-knifed back upon the arm 11 to cover the opening 23 to the chamber 17. The pivot mount 22 for the extension member 20 comprises a hinge member 26 secured within the chamber 19 to the inner side of the tubular arm 11 on trunnion ears 27 on the sides of an elongated slot 28 formed through the tubular arm 11. The hinge member 26 has one end of a spoke-like lever 29 pivotally mounted as at 22 between the trunnion ears 27. The opposite end of the lever 29 is connected to or formed integrally with a sheave-like arcuate member 30. One end of the member 30 extends through the slot 28 and is connected to the inner face of the half tubular extension member 20. (FIG. 4). The other end of the member 30 is connected as at 31 to one end of a cable 32 which rides over the grooved periphery of the sheave-like arcuate member 30. The opposite end of the cable 32 is secured to a one end of a tension spring 33, the opposite end of which is anchored to a wall 34 within the chamber 19.

As previously explained, the arm 11 is adapted to be latched in horizontal condition upon the vehicle V. The extension member 20 is folded back under the arm 11 in engagement with the car body so that the member 20 cannot be opened up until the latch 16 is released. Upon release of the latch mechanism 16 the torsion spring 14 between the mounting block 13 and arm 11 causes the latter to swing up about the pivot 12 as shown by the arrows—a—in FIG. 1. Simultaneously, therewith the extension member 20 is released to swing upwardly about the pivot mount 22 as shown by the arrows—b— in FIG. 1. Thus the cord 25 connected to the end 24 of the member 20 withdraws the folded flag 18 from the chamber 17, unfurles the flag so that it can be seen hanging down from the upper end 24 of the device as best seen in FIGS. 7 and 8.

To assure that the flag 18 will be hung in a plane transverse to the fore to aft axis of the vehicle V, a folding support arm 35 for the flag is provided. This support arm 35 as shown in FIG. 6 is constructed in three segments. 35, 35' and 35". The middle segment 35 is a tension spring to which the cord 25 is secured. The ends of the spring 35 are secured to segmental arms 35' and 35" each of which has a flanged end 36–36' abutting the center spring 35. By this arrangement the two end segments 35' and 35" of the support arm 35 can be folded back upon the latter. The flag 18 in turn is folded on similar lines and rolled up upon the overlapping segment of the support arm 35 so as to fit for storage in the chamber 17 as above explained. It will therefore be noted that when the main arm 11 is released from latched condition and the jack-knifed extension member 20 begins to open up by action of the actuating mechanism 21, the spring segment of the flag support arm straightens out to unfurl the flag and support it transverse to the plane of swing of the arm 11 and member 20.

The latch mechanism 16 as best illustrated in FIGS. 3, 4, and 5 comprises a mounting block 40 comparable to the one 13 for the main arm 11. The mounting block 40 is secured to the body of the vehicle V in alignment with the arm 11 to receive and engage the free end 15 thereof. As shown in FIG. 3, the free end 15 of the arm 11 is recessed as at 41 to support a latch hook 42 on a cross pin 42' and to embrace a U-shaped keeper 43 secured on the upright flange 44 of the mounting block 40. The latch hook 42 has its lower end shaped to hook onto a cross bar 45 supported on the U-shaped keeper 43. A leaf spring 44' on the flange 44 of the mounting block 40 maintains the hook 42 in latched engagement with the cross bar 45 against the action of the torsion spring 14 between the main arm 11 and its mounting block 13.

The latch hook 42 is released by a release mechanism, including a solenoid 46 embodied in an electrical circuit 47 best illustrated in FIG. 5. It should here be noted that part of the electrical circuit 47 is within the vehicle and part within the main arm 11 of the apparatus via a connector 48 therebetween. The electrical circuit 47 includes a source of electrical energy in the form of a storage battery and a switch means 49 on the dash board of the vehicle driver's compartment, by which electrical current is conducted to the solenoid 46. The solenoid 46 has an armature 50 having an end 51 disposed to engage the latch hook 42. The armature 50 is normally withdrawn by a compression spring 52 between the coil 53 and a flange 54 on the armature 50. Upon energization of the coil 53 by closing of the switch 49, the armature 50 is motivated toward the latch hook 42 so as to unhook the latter from the cross bar 45 whereupon the main arm 11 is released for upward swing by the torsion spring 14. Thus the flag 18 is unfurled as above explained to provide a signal visible to others during the daytime.

Means 55 for illuminating the flag 18 during the night time is also provided in the form of a lamp 56 or lamps 56 - 56' carried by the extreme end 24 of the extension member 20 above the flag support 35 as seen in FIGS. 7 and 8. This illuminating means (lamp 56 - 56') are in the electrical circuit 47, also under the control of the switch means 49. By this arrangement it will be noted that the lamps 56 - 56' become illuminated simultaneously with the energization of the coil 53 of the solenoid 46. It should here be noted, however, that the coil 53 of the solenoid is grounded through contact with the mounting block 40 on the vehicle V. Consequently, once the latch mechanism 16 has been released by the armature 50 of the solenoid, the ground contact of its coil to the vehicle is broken to deenergize the coil 53 and allow its armature 50 to resume normal condition by the compression spring 52 in the release mechanism.

With the apparatus in raised condition as shown in FIGS. 1, 7, and 8, the lamps 56 - 56' illuminate the flag 18 draped below.

Moreover, the constant illumination of the lamps 56 - 56' affords a trouble light during a stall of the vehicle.

In order to attract greater attention to the signaling means, the lamps 56 - 56' are caused to blink on and off. This is accomplished by the inclusion of a standard two stage direct coupled flasher 60 in the electrical circuit 47 and under the control of one side of the double pole double throw arrangement 61 in the switch means 49 as shown in FIG. 5. In this manner a stroboscopic flasher light is emitted from the lamps 56 - 56' either day or night to warn the drivers of oncoming vehicles of the stalled condition of the vehicle.

Having thus described my emergency warning signal for vehicles in specific detail, it will be appreciated that the same may be susceptible to alteration variation and/or modification without departing from the spirit or scope of my invention therein as called for in the appended claims.

I claim:

1. For an automotive vehicle an emergency warning signal comprising:
   1. a mounting block and an end mount adapted to be secured in spaced horizontal relation on the body of such a vehicle;
   2. A spring-loaded tubular arm having one end pivotally mounted on said mounting block and normally tending to swing in a plane toward vertical position away from said end mount;
   3. a latch means at the opposite end of said tubular arm for latchingly engaging said end mount for holding said tubular arm in horizontal relation between said end mounts;
   4. said tubular arm having a flag receiving chamber adjacent its pivotally mounted end provided with an access opening disposed face down when said arm is in a horizontal position;
   5. a half tubular member adapted to overlie the bottom surface of said tubular arm for closing the access opening therein;
   6. means for pivotally mounting said half tubular member adjacent the opposite end of said tubular arm;
   7. a folded flag arranged in the chamber in said tubular arm and having tethered connection to the adjacent free end of said half tubular member;
   8. spring actuated means formed integrally on said half tubular member and the pivotal connection thereof with said tubular arm for urging the half tubular member in jack-knife fashion away from said spring-loaded tubular arm toward extended aligned relation thereto as the latter swings toward vertical position to thereby withdraw from the chamber thereof said flag for unfolded display at the upper free end of said half tubular member; and 9. release means in the opposite end of said tubular arm operatively engageable with said latch means for releasing said arm from said end mount.

2. The emergency warning signal in accordance with claim 1 in which said release means comprises:

1. a solenoid having its coil arranged in the opposite end of said tubular arm and a normally withdrawn armature disposed for operative engagement with said latch means; and 2. an electrical circuit embodying the coil of said solenoid in the battery energized electrical system of such vehicle including a switch means in said circuit accessible from within the vehicle for energizing said solenoid.

3. The emergency warning signal in accordance with claim 2 including a warning lamp mounted on the free end of said half tubular member adapted to be energized by the said electrical of the vehicle for illuminating said lamp upon release of said tubular arm.

4. The emergency warning signal in accordance with claim 3 in which said warning lamp is of the blinker type under the control of a flasher switch coupler in said electrical circuit for intermittently causing said lamp to blink on and off.

5. The emergency warning signal in accordance with claim 4 including means in said electrical circuit for grounding the coil of said solenoid to the vehicle only during latching of said tubular arm in horizontal position relative thereto and for deenergizing said coil upon release of said spring-loaded tubular arm for movement into vertical position.

6. The emergency signaling device in accordance with claim 3 in which said warning lamp includes at least two such lamps for illuminating the unfurled flag draped along the vertically positioned extended half tubular member and tubular arm.

7. The emergency warning signal in accordance with claim 1 in which said spring actuated means formed integrally with said half tubular means comprises:

1. a segmental sheave member pivotally mounted on said tubular arm and disposed on the concaved side of said half tubular membrr for extension into the hollow of said tubular arm when the latter is in horizontal position and covered by said half tubular member; and 2. a tension spring between said segmental sheave and an anchorage within said tubular arm for turning said segmental sheave about its pivotal connection and opening up said half tubular member jack-knife fashion relative to said tubular arm as the latter swings from horizontal to normally raised vertical position.

* * * * *